July 28, 1953
T. R. COUTS ET AL
2,647,181
DELAYED ACTION CIRCUIT BREAKER FOR VEHICLES
Filed July 17, 1952
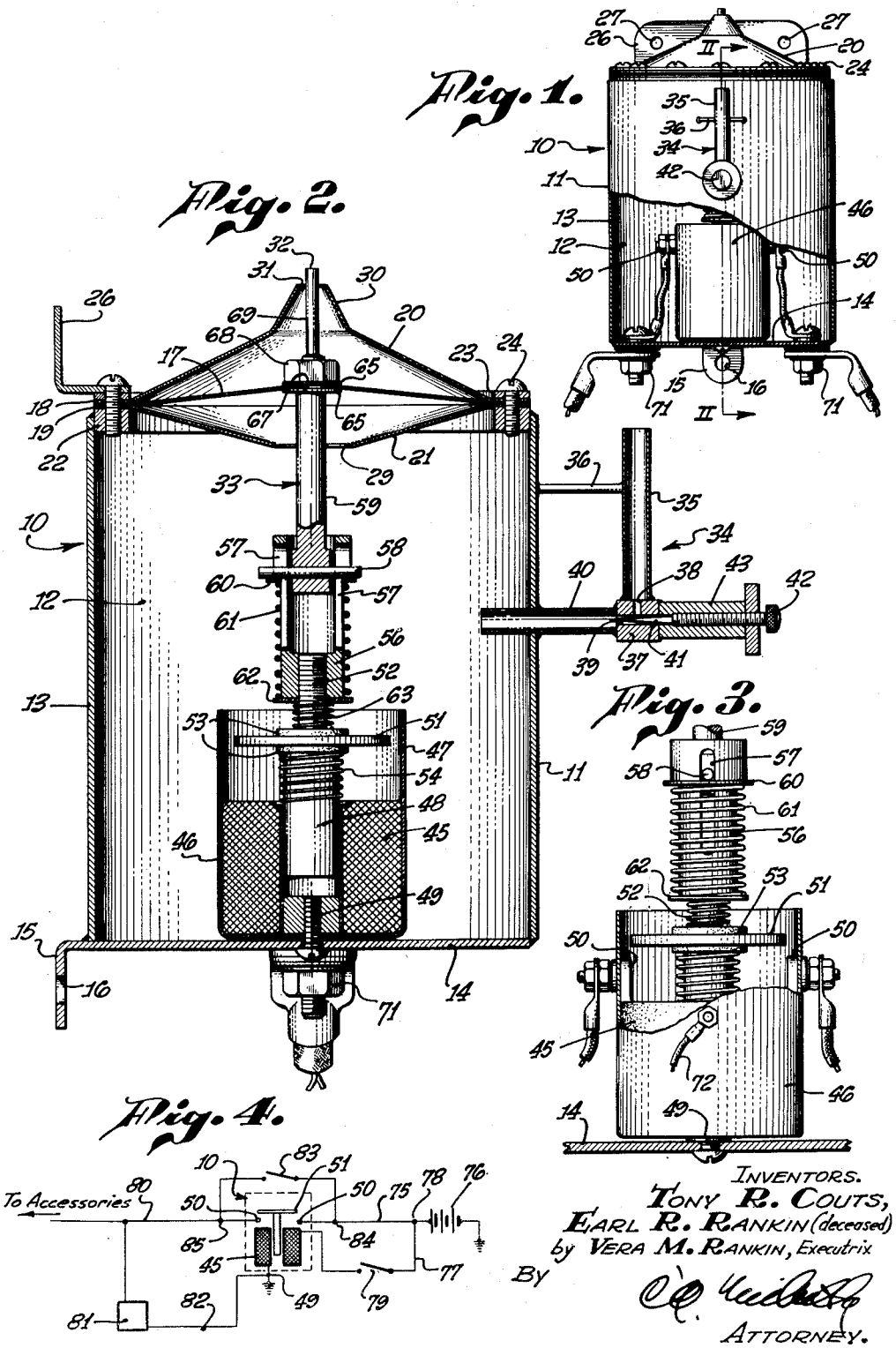
INVENTORS.
TONY R. COUTS,
EARL R. RANKIN (deceased)
by VERA M. RANKIN, Executrix
By
ATTORNEY.

Patented July 28, 1953

2,647,181

UNITED STATES PATENT OFFICE 2,647,181

DELAYED ACTION CIRCUIT BREAKER FOR VEHICLES

Tony R. Couts, Long Beach, Calif., and Earl R. Rankin, deceased, late of South Gate, Calif., by Vera M. Rankin, executrix, South Gate, Calif.; said Vera M. Rankin assignor to said Couts Application July 17, 1952, Serial No. 299,451

4 Claims. (Cl. 200—81.5)

This invention relates to a delayed action electrical control device for use in electrical circuits associated with means producing pneumatic pressure variations, as for example, an internal combustion engine. More particularly, the invention relates to an automatic operable pneumatic responsive circuit breaking device operable by vacuum pressure in an internal combustion engine for disconnecting, after a selected time interval, the entire electrical system of a vehicle or selected electrical accessories used on the vehicle.

There is a definite need for a positive, simply operable, effective, automatic circuit maker and breaker which can be readily adapted for use on a vehicle and associated with the internal combustion engine thereof. When a vehicle is parked and the engine shut off, various electrical accessories may be left operably connected to the car battery, with the result that there is a continuous drain on the battery during a period in which the battery is not being re-charged by operation of the vehicle. If such a drain on the car battery continues for a certain length of time, the battery will be incapable of supplying the required starting current loads. It is therefore proposed to design and provide a delayed action control device which is automatically operable to break the main electrical circuit or the electrical circuit to one or more accessories so that after the car has been parked, the electrical circuits will be open and the undesired drain and wear on the car battery will be prevented.

A primary object of this invention is to design and provide an automatically operable delayed action control device for vehicles which is simply constructed, easy to manufacture and to install.

Another object of this invention is to design and provide a pneumatic, responsive control device adapted to open a circuit after a predetermined selected time interval.

Another object of this invention is to design and provide a fluid pressure, responsive control device, which is operable to open a circuit wherein a single, direct-acting vacuum chamber is utilized.

A further object of this invention is to design and provide a control device, as above described, wherein a novel design of rod assembly is associated with a solenoid operated switch, the switch being adapted to open and close a main battery electrical circuit.

Still another object of this invention is to design and provide a control device, as above described, wherein fluid pressure for actuating the device is controlled or metered at the beginning of the use of the electrical circuit and at the end of such use.

Generally speaking, this invention contemplates a simply constructed, delayed action control device, comprising a vacuum chamber defined by an open-ended, hollow, cylindrical housing, the open end of said housing being closed by a flexible diaphragm. Within the housing is mounted a solenoid means of suitable capacity, including a reciprocally movable solenoid element. The solenoid element carries an electrical, contact making ring and is associated with a rod assembly which is carried and connected to the diaphragm. Duct means are provided for forming a passageway, communicating with the interior of the vacuum chamber and with the intake manifold of an associated internal combustion engine. The passageway is provided with a metering valve element which may be readily adjustable to control flow of air between the manifold and the vacuum chamber.

Other objects and advantages of this invention will be readily apparent from the following descriptions of the drawings.

In the drawings:

Fig. 1 is a side elevation view of a control device embodying this invention, a portion of the housing thereof being broken away.

Fig. 2 is an enlarged, sectional view of the device shown in Fig. 1, the section being taken in the plane indicated by line II—II of Fig. 1.

Fig. 3 is a fragmentary, partial view of the solenoid and associated rod assembly used in the device shown in Fig. 1.

Fig. 4 is a diagrammatic view of a wiring circuit which may be used with the device of this invention.

The control device embodying this invention, generally indicated at 10, includes a hollow, cylindrical, open-ended housing 11 defining a vacuum chamber 12. The housing 11 may comprise a cylindrical wall 13, having a bottom end cover plate 14, secured to the end edge margin of wall 13 as by welding. The end plate 14 may include an extension 15 generally disposed longitudinally of the wall 13 and spaced radially outward therefrom so as to provide a suitable connection to a mounting surface. The extension 15 may include a port 16 for receiving the bolt.

Means for closing the opposite and top end of housing 11 comprises a flexible diaphragm 17 which extends across the top open end of cylindrical wall 13 and which is mounted so as to provide a pneumatic seal. The pneumatic seal is conveniently formed by positioning circumferential margins of diaphragm 17 between opposed circumferential flanges 18 and 19 of top and bottom protective, generally shallow cone-shaped walls 20 and 21 respectively. An annular member 22 may be secured as by welding to the inner marginal periphery of the top open end of cylindrical wall 13, said annular member providing a seat for circumferential flange 19 of the bottom wall 21. An annular securing ring 23 may be seated on circumferential flange 18 of top wall 20 and secured as by a plurality of circumferentially spaced screw bolts 24 extending through the flanges and into threaded engagement with member 22.

An elongated mounting bracket 26 may be secured by certain of said bolts 24 on the same side of the device as mounting extension 15. The bracket 26 may include spaced ports 27 for securing the top of the device to a suitable mounting surface.

The top and bottom protective walls 20 and 21 substantially enclose flexible diaphragm 17 while permitting limited axial deflection of said diaphragm. The bottom wall 21 includes an axial, relatively large port 29 for permitting communication with the vacuum chamber 12.

The top wall 20 terminates in a frusto-conical end portion 30 of steeper inclination than wall 20. An axial port 31 in portion 30 receives therewithin the top end 32 of a rod means, generally indicated at 33, for guiding and maintaining the rod means 33 in substantially axial relation.

Passageway means generally indicated at 34 are carried by cylindrical wall 13 of the housing and are adapted to be connected to the intake manifold of an associated internal combustion engine so as to provide communication between vacuum chamber 12 and said intake manifold. The passageway means 34 includes a vertically disposed tube 35 secured as by an arm 36 to wall 13. The bottom end of tube 35 is connected to a valve block 37 having a vertical bore 38 leading to a transverse bore 39. Bore 39 communicates with a pipe 40 extending through wall 13 and into chamber 12. Pipe 40 may be secured and sealed as by welding to the wall 13.

The bore 39 in the valve block 37 may receive a tapered needle valve element 41 carried by an adjusting stem member 42 threaded in a valve portion 43. The needle element 42 may thus be readily adjusted so as to control the passageway of fluid (air) through the passageway means 34 between vacuum chamber 12 and the intake manifold.

Within the housing 10 may be mounted suitable solenoid means including coil means 45 carried within a hollow cylindrical container 46 having an open-ended extended portion 47 above coil means 45. A solenoid element 48 is reciprocally movable within the coil means 45. A screw bolt 49 extends through closure plate 14 and the bottom wall of the container 46 to secure container 46 within the housing.

Carried on the inner surface of extended portion 47 are a pair of spaced electrical terminals 50, said terminals 50 presenting inner electrical contact surfaces to edge margins of circular ported contact disc 51 carried by the solenoid element 48. The solenoid element 48 may be provided with a shoulder defining a threaded, reduced portion 59 over which the ported disc 51 is sleeved for seating on said shoulder. Insulating washers 53 are provided on opposite sides of discs 51. In lowermot position and when energized by coil means 45, the contact disc 51 is adapted to make electrical contact with terminals 50 for closing an electrical circuit as later described. Spring means 54 extending between coil means 45 and the lower insulating washer 53 normally bias contact disc 51 into circuit open position.

The rod means 33 provides an extendible and contractible connection between flexible diaphragm 17 and the reciprocally movable solenoid element 48. Such a connection permits the contact disc 51 to close the circuit between terminals 50 before the flexible diaphragm 17 is responsive to vacuum produced in the intake manifold so as to permit starting of the internal combustion engine.

The rod means 33 includes a hollow tubular sleeve member 56 secured as by threading to the threaded reduced portion 52 of the solenoid element 48. The sleeve member is provided with longitudinally extending, diametrically opposed closed-ended slots 57 which are adapted to slidably receive a transverse pin 58 carried by a rod extension 59. The pin 58 is seated on a top movable annular spring seat 60 against which bears one end of a coil spring 61 having its lower end seated on a bottom movable annular spring seat 62. The spring 61 is sleeved over the hollow sleeve member 56. The bottom spring seat 62 is resiliently supported from the upper insulating washer 53 by means of a coil spring 63 extending between said seat 62 and washer 53.

The rod extension 59 extends upwardly through port 29 in bottom wall 21 of the upper closure for the housing and through a port in diaphragm 17. The port in diaphragm 17 may be sealed by a pair of annular washers 65 on opposite sides of a diaphragm 17 and secured in tight relationship between a shoulder 67 formed on rod extension 59 and a nut 68 threaded to a reduced threaded portion of extension 59. The extension 59 terminates in a guide rod 69 projecting upwardly through port 31 in the top wall 20 of the top closure of the housing.

As best seen in Fig. 1, the terminals 50 are connected by suitable leads to terminal posts 71 provided exteriorily of bottom wall 14 of the housing 11. A ground connection 72 may be provided for the coil means through the securing screw 49.

An exemplary circuit diagram is diagrammatically illustrated in Fig. 4, wherein the control device is shown as being connected to a main hot battery lead 75. It is understood of course that the control device may be connected in series to other battery leads for selected accessories so that operation of the device serves to only automatically shut off the lights, radio, etc., as desired.

In Fig. 4, a battery source is shown at 76 connected to ground. Main lead 75 is connected to one of the terminal posts 71. A lead 77 is connected to lead 75 and 78, includes a starter switch 79 and is connected to one end of the coil means 45. The other end of the coil means 45 may be connected to ground through the screw 49 so as to complete a circuit when the switch 79 is closed for energizing coil means 45 and moving the contact disc, into circuit making position with terminals 50. Lead 80 from the other terminal 50 is connected to a starter solenoid 81, solenoid 81 being connected through lead 82 to the ground at screw 49. Lead 80 is also connected to the remainder of the electrical system of the vehicle and contact disc 51 serves to open and close the main lead from the battery. An emergency switch 83 by-passes the control device 10 and is connected as at 84 and 85 to leads 75 and 80.

In operation, it will therefore be readily apparent that upon closing of the starter switch 79 as shown in the circuit diagram in Fig. 4, the solenoid coil means 45 will be energized so as to move downwardly the solenoid element 48. Such movement will close the circuit between terminals 50. Because of the pin and slot connection of the rod means 33 to the solenoid element 48, such movement will not immediately effect the position of the flexible diaphragm 17 and the springs 61, 63 and 54 will be compressed. As the engine begins to turn over, vacuum is produced in the intake manifold and the chamber 12 is partially evacuated of air so as to cause a reduction in air pressure therein. The rate of such evacuation is controlled by the position of the needle element 41. After the motor has operated for a selected period of time, the partial evacuation of air from chamber 12 causes the flexible diaphragm 17 to collapse inwardly and thus move the rod extension 59 downwardly to cause the transverse pin 58 to again bear against top spring seat 60. Therefore, as long as the vacuum is maintained in chamber 12, the contact disc 51 will be maintained in circuit making position by the inward collapse position of the diaphragm.

When the engine is stopped, the needle element 41 controls the entering of air at normal air pressure into the vacuum chamber 12 so that after a selected period of time, as for example, one minute, the pressure in chamber 12 will be substantially equal to atmospheric pressure and the flexible diaphragm 17 will assume a normal position. In such normal position, the rod means 33 is in extended relation and the contact disc 51 is out of contact with terminals 50 and the main battery circuit is thereby broken. Breaking of the circuit automatically disconnects the main hot lead 75 from the battery source 76 so that the electrical system of the auto is dead.

Switch 83 is provided for emergency purposes, such as when the motor stops on a hill at night and current is required for the lighting system. Normally switch 83 is open.

The extensible rod means 33 thus permits the solenoid element 48 and contact disc 51 to move downwardly upon closure of the starter switch 79 without displacing the diaphragm 17. It should also be noted that the metering or control of the flow of air pressure outwardly from vacuum chamber 12 results in the diaphragm 17 being displaced in a cushioned and gentle manner. Thus the combination of the extensible rod means 33 and the metering of the outflow of air from chamber 40 provides a cushioned action in the control device which minimizes wear on the diaphragm 17 and permits the device to operate smoothly and effectively. Obviously if the rod means 33 were rigid and non-extensible and the outflow of air from chamber 12 were not controlled, upon closing of the starter switch, the diaphragm 17 would be violently displaced inwardly and wear along the circumferential margins of the diaphragm would be excessive.

When the engine associated with this control device is stopped, the diaphragm 17 is gently displaced back to normal position by the control of the inflow of air into the chamber 12. Thus the reciprocal action of the rod means 33 is cushioned and gentle.

It is understood that various changes and modifications may be made in the exemplary construction of a control device described above, including changes in the circuit arrangement, in the extensible and contactable rod means, and in the contact engagement between the disc 51 and the terminals 50.

All such changes and modifications coming within the scope of the appended claims are embraced thereby.

We claim:

1. In a delayed action control device adapted to be responsive to fluid pressure and arranged to be connected to the intake manifold of an internal combustion engine, the combination of: a hollow housing having a flexible diaphragm forming one wall thereof; a solenoid means, including a movable solenoid element, carried by an opposite wall; terminal means within said housing; a contact member carried by said solenoid element adapted to engage said terminal means in one position to close an electrical circuit; means normally biasing said solenoid element to a second position to open said circuit; means connecting said solenoid element to said diaphragm for moving said element in response to movement of said diaphragm and including, a hollow sleeve member carried by said element and provided with a longitudinally extending slot; a rod extension carried by the diaphragm and having an end portion slidably received in said sleeve member; a pin carried by said end portion and cooperable with said slot; spring means normally biasing said rod extension and pin outwardly; and valved means connecting said chamber and the intake manifold.

2. A device as claimed in claim 1 wherein guide means are carried by the housing for the rod extension.

3. A device as claimed in claim 1 wherein said valved means includes an adjustable needle valve operable to limit passage of fluid to and from the interior of said housing.

4. In a pneumatic responsive device for making and breaking an electrical circuit and adapted to be associated with an internal combustion engine, the combination of: a hollow housing having a flexible end wall and defining a chamber; a port in said housing adapted to be connected to the intake manifold of the engine; spaced electrical terminal means in said chamber; a solenoid means in said chamber and having a movable solenoid element between said terminal means; contact means carried by said solenoid element for engagement with said terminal means to close an electrical circuit; and rod means connected to said solenoid element and to said flexible end wall, said rod means limitedly axially extendable and contractible, said rod means including a rod extension carrying a transverse pin, a hollow sleeve member having slots therein to accommodate said pin, and spring means between said pin and said contact means.

TONY R. COUTS.
VERA M. RANKIN,
Executrix of the estate of Earl R. Rankin, deceased.

References Cited in the file of this patent
UNITED STATES PATENTS

| Number | Name | Date |
| --- | --- | --- |
| 1,719,049 | Forsberg | July 2, 1929 |
| 2,068,484 | Coffey | Jan. 19, 1937 |
| 2,302,685 | Dyer | Nov. 24, 1942 |